United States Patent [19]

George et al.

[11] Patent Number: 5,371,867
[45] Date of Patent: Dec. 6, 1994

[54] METHOD OF USING SMALL ADDRESSES TO ACCESS AND GUEST ZONE IN A LARGE MEMORY

[75] Inventors: Jonel George, Pleasant Valley; Roger E. Hough, Highland; Moon J. Kim, Wappingers Falls; Allen H. Preston, Poughkeepsie; David E. Stucki, Poughkeepsie; Charles F. Webb, Poughkeepsie, all of N.Y.

[73] Assignee: International Business Machines Corporation, Armonk, N.Y.

[21] Appl. No.: 974,393

[22] Filed: Nov. 10, 1992

[51] Int. Cl.5 ............................................. G06F 12/08
[52] U.S. Cl. ............................... 395/400; 364/228.2; 364/247; 364/247.8; 364/256.3; 364/DIG. 1
[58] Field of Search .................................. 395/400, 425

[56] References Cited

U.S. PATENT DOCUMENTS

| | | | |
|---|---|---|---|
| 4,564,903 | 1/1986 | Guyette et al. | 395/200 |
| 4,843,541 | 6/1989 | Bean et al. | 395/400 |
| 4,926,322 | 5/1990 | Stimac et al. | 395/400 |
| 4,943,910 | 7/1990 | Nakamura | 395/400 |
| 4,985,871 | 1/1991 | Catlin | 365/230.06 |
| 5,042,003 | 8/1991 | Belt et al. | 395/425 |
| 5,123,098 | 6/1992 | Gunning et al. | 395/400 |
| 5,175,830 | 12/1992 | Sherman et al. | 395/400 |
| 5,237,661 | 8/1993 | Kawamura et al. | 395/250 |
| 5,237,669 | 8/1993 | Spear et al. | 395/400 |
| 5,247,631 | 9/1993 | Hilton et al. | 395/400 |
| 5,271,098 | 12/1993 | Khan et al. | 395/400 |
| 5,280,599 | 1/1994 | Arai et al. | 395/425 |

OTHER PUBLICATIONS

"IBM System/370 Extended Architecture-Interpretive Execution" IBM Publication No. SA22-7095-1, 2d Ed., Sep. 1985.

Primary Examiner—Joseph L. Dixon
Assistant Examiner—Michael A. Whitfield
Attorney, Agent, or Firm—Bernard M. Goldman

[57] ABSTRACT

Enables a host (hypervisor) to access any location in any guest zone in a large memory, when host and guest operands have small addresses that cannot access locations outside of their own zones. System hardware/microcode provides a particular number of windows for host use. Each CPU in the system has one or more window access registers (WARs), and one or more window registers (WRs). The host uses a load WAR instruction to designate each page frame (PF) in the host zone to be used as a host window, and each PF is associated with a respective window number. When the host receives an interception signal requiring the host to access a guest location represented by a guest zone identifier and a guest small address, the host designates one of its window numbers for an access to this guest location. Then, the host executes an activate WR instruction which invokes CPU hardware/microcode that generates a large absolute address for accessing this guest location in the large memory and stores it in a WR associated with the window number. When the host thereafter executes any instruction with an operand small address accessing the host window PF associated with that WR, and CPU hardware/microcode automatically substitutes that guest large address in the WR for the host operand small address for accessing the guest location.

17 Claims, 8 Drawing Sheets

THE TWO DESIGNATED CONSECUTIVE PF's ARE ASSOCIATED WITH WR0 AND WR1 RESPECTIVELY.

WINDOW NUMBER    CPU WINDOW SPECIFICATION TABLE

| | | | |
|---|---|---|---|
| W0 | ZN | GUEST ADDRESS (SMALL) | LARGE ABSOLUTE ADDRESS |
| W1 | ZN | GUEST ADDRESS (SMALL) | LARGE ABSOLUTE ADDRESS |
| ⋮ | | | |
| Wn | ZN | GUEST ADDRESS (SMALL) | LARGE ABSOLUTE ADDRESS |

SD TABLE (IN HOST ZONE)    FIG. 9

METHOD OF USING SMALL ADDRESSES TO ACCESS AND GUEST ZONE IN A LARGE MEMORY

INTRODUCTION

This invention allows a host to access any location in any guest zone in a large memory when the host and its guests are each using small addresses that can only address locations within the zone local to the host or guest.

BACKGROUND

A "small address" is herein defined to use any of the common address sizes of 16, 20, 24, 31 or 32 bits. A "large address" is herein defined to have a size of greater than the small address size being used. Many existing programs use small-size virtual addresses, which are translated into small real or absolute addresses. The translated real or absolute addresses are used to access the memory.

Previously-designed hosts (hypervisors) could not access any location in a large memory requiring an address size greater than the size used by the host. Prior types of hosts and their guests (operating systems, OSs) were each designed to use small size addresses (e.g. 31 bit addresses which can only address upto a $2^{**}31$ byte size memory). The OSs were each assigned to different zones in the memory of a computer system. The size of each zone was a fraction of the memory size. A host (hypervisor) supervised the OSs and had to be able to address any location in every guest's zone.

Small addresses are used in a prior logically-partitioned system disclosed in U.S. Pat. No. 4,843,541 to Bean et al, which is assigned to the same assignee as the subject invention. In that system, guests are located in different memory zones, and each guest is an operating system (OS) such as a copy of the IBM MVS (multiple virtual storage) or VM (virtual machine) operating system. The host is a hypervisor program (like VM) which supervises all guest operating systems in the different partitions of the system. The zones are different contiguous areas in system main storage respectively assigned to the different logical partitions configured from all of the resources of a system, called a Central Electronic Complex (CEC). The guest and the host each use a 31-bit small address size. All presently known hypervisors for controlling logically partitioned systems can only handle small addresses. No windows are known to be used in such systems.

"Windows" have been previously used by personal computers (PCs), in which a window is located in four unused 16 KiloByte areas in the lowest 1 megabyte (MB) of storage used by the PC DOS software operating system. Using a window, 16 KB pages of data were transferred between the lowest 1 MB of memory and extended memory addresses greater than 1 MB, upto the maximum extended address of $2^{**}24-1$. Such windows enabled a PC to use a memory size up to 16 MB. An example of such prior art is U.S. Pat. No. 4,943,910 to N. Nakamura.

Large memory addresses were previously disclosed in patent application Ser. No. 07/816911 filed Jan. 3, 1992 entitled "Guest/Host Large Addressing Method and Means". This application provides address translation of a guest's small or large address into a large absolute address, assigned to the same assignee as the subject application. It does not use windows for addressing.

Another patent application dealing with large addresses is Ser. No. 07/803320 filed Dec. 6, 1991 entitled "Large Logical Addressing Method and Means", assigned to the same assignee as the subject application. This application uses guest small addresses to generate large addresses for addressing a large memory. It does not use windows for addressing.

SUMMARY OF THE INVENTION

A large expansion in the size of the system memory in mainframes and other computers may allow them to contain much more data and programs and to perform more function than previously used. For example, more logical partitions may be provided in a mainframe to provide more zones in a large memory to support more guest operating systems.

The guests are supervised by a host (hypervisor), which may be in software (like VM, virtual machine) or in microcode or internal code (like the IBM PR/SM, processor resource/system manager). A host must be able to access the locations in each guest zone.

Current IBM mainframes have a small main memory (up to $2^{}31$ bytes=2 GB) which is partitioned among a plurality of guests and a host (hypervisor). In current IBM PR/SM and VM systems, the host uses 31 bit small addresses to access any guest location, whenever required. This host requirement restricts the memory size to being not greater than $2^{}31$ bytes, since the host must be able to access any guest location. The guests also use 31 bit addresses.

It is costly and burdensome to change currently-used hosts and guests (designed to use small size addresses) so that they can use large size addresses.

It is a primary object of this invention to minimize hardware/microcode changes in a system to enable conventional hosts (which can only use small size addresses) to be able to operate with guests in a large memory without requiring the host to recognize the large addresses needed to perform a data transfer between the host and any guest using a large memory.

A guest location may be indicated to a host by giving the host a guest identification signal in combination with a guest's small size address.

Accordingly, it is another object of this invention for allowing a host to use conventional small addresses (e.g. 31 bit) to access any guest location in a large memory (even though the guest location is outside the range of the small address being used by the host).

With this invention, the ability of a host to use a small address to access any guest location in a large memory is obtained by: 1. defining a window page frame (PF) in the host zone; and 2. associating the host PF with a large guest address transparent to the host. When the host wants to address the guest location, the host uses a small address to address the window PF, then hardware/microcode (and/or internal code) in the CPU automatically substitutes the associated large address for that host small address, and the large address then locates the required guest location in any guest zone.

The actual guest address (a large address) to any guest location is not seen by the host program, which handles only conventional small addresses. CPU hardware/microcode (transparent to the host and guests) automatically detects when any guest location is to receive host attention, and identifies to the host that guest's zone and the guest small address to that guest location. With this information, the host can invoke hardware/microcode that transparently uses that guest zone and small address to set up a large absolute address which is indirectly usable by the host program via a host window (located by a host small address).

Hence, the host and guest programs are each presumed to be using conventional small addresses. The CPU hardware/microcode changes the guest small address into a large absolute address by adding to the zone origin of the guest, or prefixing, or reverse prefixing the small address, depending on its value.

For conventional host programs to use this invention on a system, the host program needs to be changed only to the extent of addressing a host window PF instead of a guest location. The CPU hardware/microcode needs to be changed only to enable the host to define its window PFs and to provide a guest large address in a hidden window register (WR) whenever a host instruction uses a small address to access a guest location.

An implementation of this invention is done by: 1. locating each host window PF in the host zone by means of a window access register (WAR) containing a host small address that locates one or more host window PFs; and 2. associating each host window PF with a window register (WR) for containing a large absolute address.

The WAR is implemented in one of two alternative ways: 1. One or more WAR(s) are provided, and each WAR locates a single host PF; or 2. A single WAR is provided, and the content of the WAR locates multiple contiguous host PFs. A particular host window PF (in the set of multiple contiguous host window PFs) is selected among these multiple PFs by low-order bits in the PF address in each host small address provided for accessing a host window PF. Addresses to the different host window PFs can be independently used by the host, even when all window PFs are defined by a single WAR. That is, the host may concurrently be using different window PFs for accessing different guest locations in same guest zone, or in different guest zones.

The content of each WAR is configured by the host executing an instruction that loads a WAR with a small address which locates a window PF specified by the host in the host zone.

The existence of one or more WRs and their association with a respective number of host windows is determined by the hardware/microcode structure of a system. However, the association of a WR with a host zone PF is not determined until execution of a load WAR instruction, and the association of a WR with a particular guest small address is not determined until execution of an activate window instruction.

More generally, the number of contiguous window PFs located in a zone by a single WAR is defined by the expression, 2**P, where P is the number of lowest-order bits in the PF component in a zone operand address for accessing a window. Hence, a zone operand address is provided by an instruction within the host zone, and such address automatically selects the required window PF in a designated set of host window PFs, because a zone operand address contains a "PF address component" having P number of its lowest-order bits which automatically perform the window PF selection.

Each window in a zone is associated with a window register (WR) and a window space. The association of the window space to a window is explicitly done by a load WAR instruction executed in the host zone. The association of the WR to a window is implicit in the design of CPU hardware and/or microcode providing this invention.

Whenever an executing host instruction operand is equal to any host window PF address, hardware/microcode in the CPU automatically substitutes the large absolute address contained in the WR associated with that host window PF. This provides automatic indirect large addressing by the host operand to the guest location having the large address in the associated WR.

Whenever a host instruction operand address is not equal to any of the host window PF address, no host window is selected, and no indirect large addressing operation is done. Then, the host instruction operand address is accessed in the host zone as a normal host address, as is done in the prior art, including prefixing and reverse prefixing.

Any type of host instruction having a storage operand may specify a host window address as to access an associated guest address. Any type of host instruction operation may be done in a guest zone, for example the host may move a storage operand between two different guest locations by specifying two different host window PFs for the two operands of the two different guests, which have two different WRs respectively associated with them.

Accordingly, it is another object of this invention to enable a host to use small addresses to move/copy data between two different guest locations, or to move/copy data between two locations in the same guest zone.

A zone information table (ZIT) defines the zones of the respective guests existing in a system at any time. A WR activating process supported by hardware/microcode checks a requesting guest's small address against zone limit information in a ZIT entry for the respective guest's zone to assure the small address is within the addressing range of the guest's zone before putting its large address into the WR.

The process for loading a WR with a large address (representing the small address of a guest) may be invoked by detection of a virtual machine interception or interruption event in the system. The existence of such an event may be indicated by signals stored in a state description (SD) of a SIE (start interpretive execution) instruction. Each guest in the system is assigned a respective SD, which is a control block in main storage containing all information needed by the system to handle the operations for each guest. The manner of indicating interceptions, interruptions and their small addresses in SDs available to a host is explained in a 1985 IBM publication SA22-7095-1 entitled "IBM System/370 Extended Architecture Interpretive Execution".

Pertinent information in any SD which may be used by this invention includes: indicators of the occurrence of an interception and interruption event, and a Small address specifying a location in the guest's zone affected by a current interception or interruption event.

The host assigns a host window to each guest operand to be accessed by the host in a guest zone, based on information passed to the host from the guest's SD in response to a guest interception or interruption indication.

Another feature of this invention is to dynamically allow reconfiguration of the ZIT (zone information table) at any time during system operation to redefine the zones for the host and guests in a system.

The host has inherent authorization to access any guest's zone, which is essential for a host to save a guest from unforeseen problems which may be caused inadvertently by guest actions.

The host zone need not be the memory's first zone (with the lowest address range) in a large memory. The host zone may be outside the range of any small addressing capability applied to a large memory (which is different from the prior-art PC windows used to support PC expanded memory).

This invention permits a simple hardware and/or microcode addition in a computer system to enable host programs using small addresses to access any location in a large memory.

DESCRIPTION OF THE DRAWINGS

FIG. 9 is a simplified diagram showing an example of state description (SD) entries in a host table in which the host determines the locations in guest zones needing access by the host.

DETAILED DESCRIPTION

Figure 1:
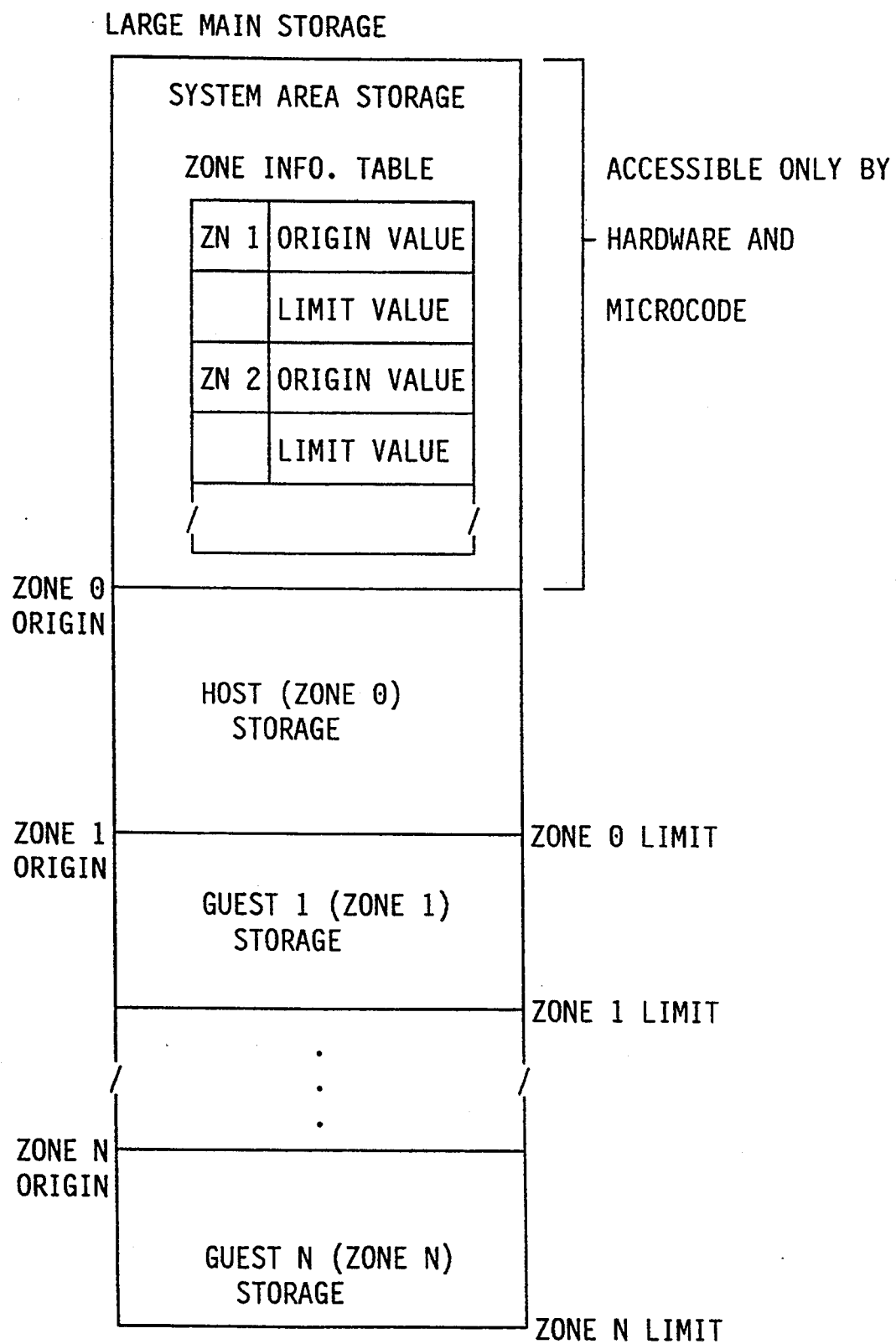
FIG. 1 shows a simplified map of a system memory having N number of guest zones, and a system area storage in a computer system which is using an embodiment of this invention.

Map of A Large Memory—FIG. 1

The preferred embodiment of this invention locates a host (hypervisor) and plural guests (operating systems) in a large memory of a mainframe, in which the memory size is more than 2 GigaBytes (2GB) of real storage (it is preferably many times 2 GB), and the host uses 31 bit small addresses which can only address within a 2 GB range.

FIG. 1 shows a map with areas in the large memory assigned to a host, multiple guests, and a "system area storage", all of which are part of the system main storage hardware entity. However, the system area storage is only addressable by hardware and microcode (internal code) and is not addressable by programs running on any CPU in the system. The host and guest zones are each located in the program addressable part of the memory entity. The size of each zone is less than $2^{**}31$ bytes.

Each of the zones (host or guest) may be located anywhere in the memory entity where space exists, and they may be located in any order in the memory entity. The memory space within each zone is contiguous.

The host and each guest use small addresses, which in the preferred embodiment have a 31 bit size. A small address is only capable of addressing locations within a single zone, which is enforced by a limit check on each memory address issued by each guest.

The real memory space is divided into units called "page frames (PFs)", which are used in address translation and relocation. In the preferred embodiment, the real memory space is divided into 4 kilobyte (KB) page frames (PFs), and each PF in the memory is located on a 4 KB boundary.

In a conventional manner, each virtual address of a guest is first translated into a real address. Then the real address is changed into an absolute address by using address prefixing in the manner found in the prior art for IBM ESA/390 systems, for which all real addresses are the same as their corresponding absolute addresses, except for real address zero and a real address equal to the prefix address of the CPU.

All addresses in this detailed description are absolute addresses when used for a memory access.

The preferred embodiment provides two windows within the host zone, and uses these windows for accessing any two locations in any other zone, or in any two other zones, in a large real memory requiring large addresses.

The host is given the choice of locating these two windows anywhere in its zone. Preferably the windows are located where they are least likely to interfere with host instruction operands that access data within the host zone.

Each window is assigned to a page frame, PF, in the host zone. The preferred embodiment locates the two windows by means of one window access register (WAR). This assignment is done by executing the "load WAR" instruction shown in FIG. 2.

Figure 3:
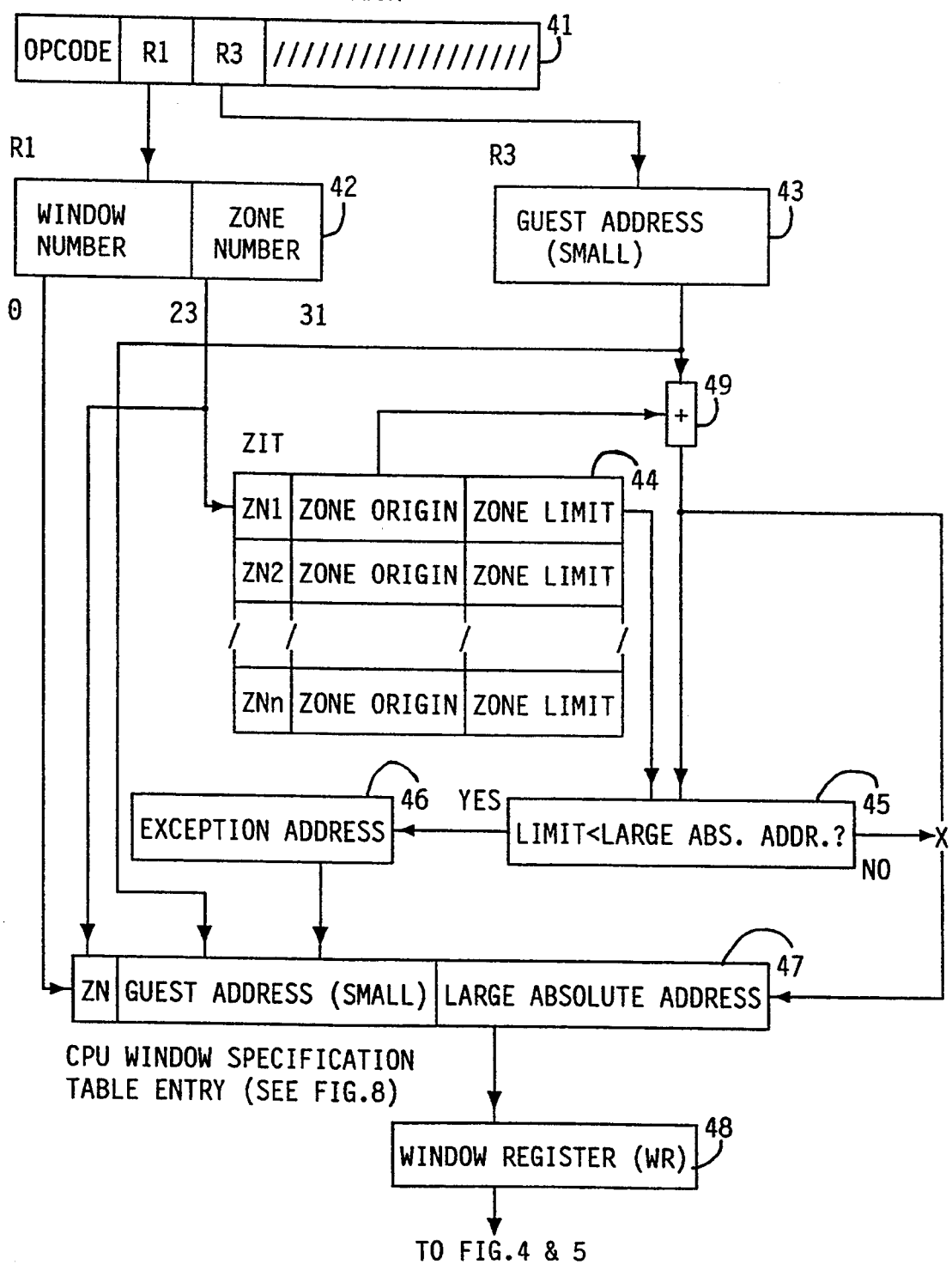
FIG. 3 represents hardware and a process used by an "Activate Window" instruction for loading any window register (WR) with a large address for accessing a location anywhere (in any zone) in a large memory.

However, another embodiment of the "load WAR" instruction is shown in FIG. 3, in which plural WARs respectively locate non-contiguous PFs as respective windows in the host zone. This embodiment uses a "load WAR" instruction shown in FIG. 3, which assigns a single host PF to one of plural WARs. Therefore, as many load WAR instructions need to be executed as there are WARs, in order to assign a host PF to each of the plural WARs.

The WRs themselves need not be apparent to the host or any guest. The existence of WRs need not be indicated in any host or guest program code.

The preferred embodiment provided herein assumes only a host zone uses windows, and the guest zones do not have windows. The WAR(s) are loaded when the system is initialized.

In the preferred embodiment, in which a single WAR locates two window PFs, the state of the lowest-order bit in the PF address component of the host operand designates which of these two window PFs is being addressed. (If four host window PFs were provided, the state of the two lowest-order bits in the operand address PF component would be used (which are bits 18 and 19 in a 31 bit address) to select the window PF being addressed).

In more detail in the preferred embodiment, two window numbers are provided to the host, and each window number has an implicitly associated WR, fixed either at the time the machine is designed, or at the time a version of machine microcode is loaded into the machine. The WR numbers specified in the preferred embodiment are sequentially fixed to the windows numbers, so that WR0 is assigned to window 1, and WR1 to window 2. If there were more window numbers, they would each be associated with a different WR. Hence, each window number has an implicitly associated WR.

Also in the preferred embodiment, the WRs each can contain a 63 bit address for accessing any location in the large memory.

With a fixed number of windows and a fixed association of WRs to the windows available to the host zone, the host needs to assign window space to each window number using the load WAR instruction.

Figure 2:
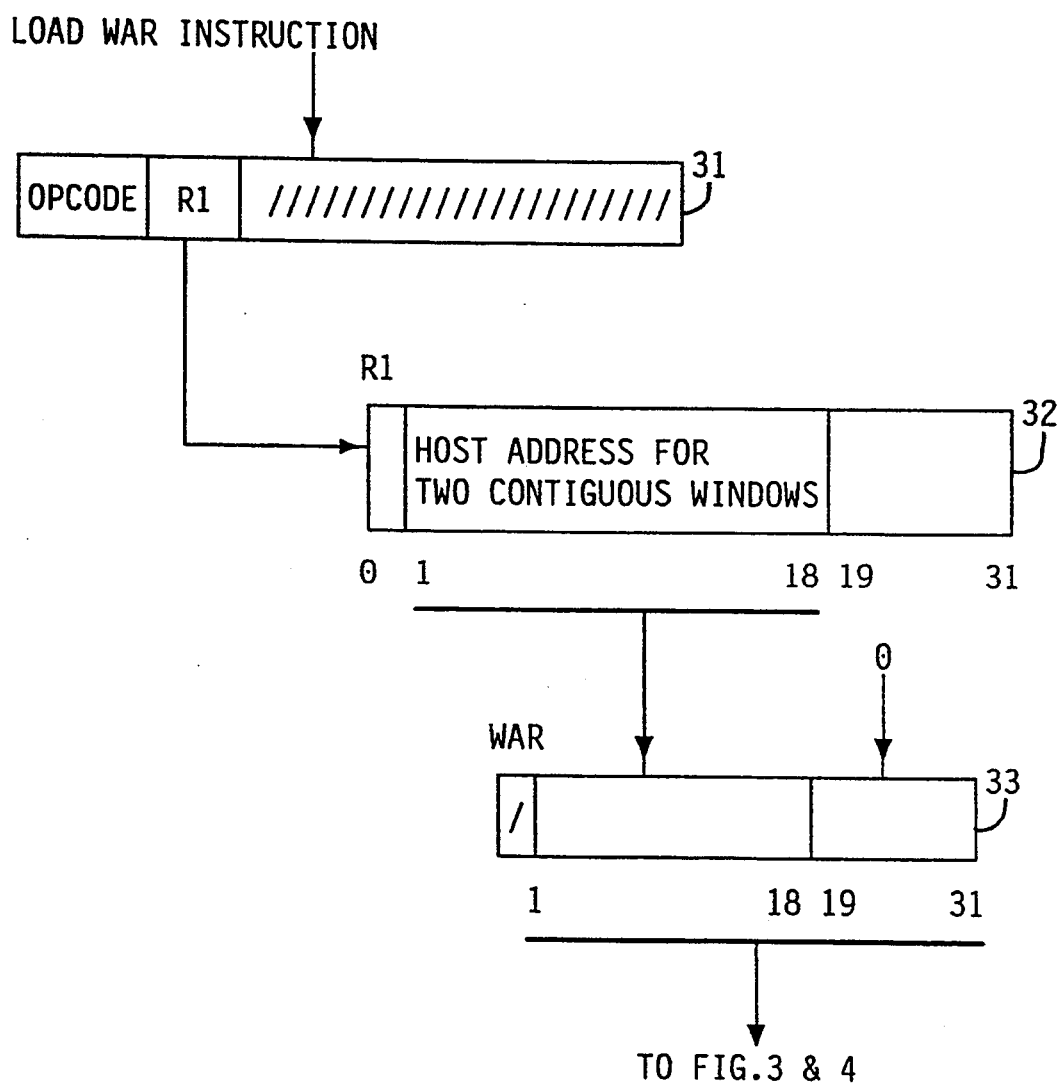
FIG. 2 represents hardware and a process used by a "load WAR" instruction for loading a window access register (WAR).

Locating Windows in Host Zone—FIG. 2

The assignment of a host PF to each host window is done by a "load WAR" instruction executed by the host. This host window-to-PF assignment implicitly assigns a WR to a designated PF, in the process of associating the PF with the window. The load WAR instruction execution is done by the hardware/microcode in any CPU in the system in which the host is executing.

FIG. 2 shows the load WAR instruction hardware and process. The instruction has an operation code and has a single operand that designates general register R1. Before execution, R1 was previously loaded with a host PF address in its bit positions 1–18, which locates an 8 KB area containing two contiguous PFs. The assignment process transfers the PF address in R1 bits 1–19 to bit positions 1–19 in the WAR, and zeros are written into WAR bit positions 20–31. WR0 and WR1 are implicitly associated with the two windows, with the WAR addressed PF being associated with WR0, and the other PF being associated with WR1. The state of bit 19 in the operand address will select the correct window PF.

The host performs the load WAR instruction on each CPU independently of the other CPUs in the system, so that each CPU has its WAR loaded. Different host PF assignments may be made to the same window number, if desired, in the different CPUs. In the discussions in this application, the same host PF address is assumed to be assigned to the same window number in all CPUs to minimize confusion that different assignments may cause.

A WR must be loaded with a guest large address before the host is able to access a guest location. Either of the host windows may be used by the host for accessing any guest location. After the WR is loaded with a guest large address, the host software can execute any instruction having an operand address to a byte location within any window PF currently specified by the WAR. Then the hardware implicitly accesses the large address in the associated WR by substituting that large address for the host's small address in performing that host instruction.

The accessed guest location may be on any byte boundary in any guest zone. Each host window is located on a PF boundary, since a PF of memory space is needed to accommodate all possible byte displacement (D) values for any host address in a window.

Because each host address to a window causes an address substitution operation, the host cannot fetch or store any data stored in any host window by using any address directed to any host window PF while the window has been activated by an "activate window" instruction. Hence, the host should not store any data in any of its window PFs expected to be accessed by using the address of a window.

However, the host can store and fetch data in any window PF if the host uses a non-window address for a large operand that requires plural contiguous PFs, including one or more window PF(s) to contain its data. For example, an operand in a move-character-long instruction may specify a non-window operand address for operand data extending through one or more window PFs.

Host Assignment of a Window for a Guest Access—FIG. 3

The host assigns a window number to a guest location by executing an "activate window" instruction. This instruction assigns a window number (host designated in a field in an R1 register 42) to a guest small address (host designated in an R3 register 43) within a guest zone (host designated in an R1 register 43). Then, the WR associated with the designated window number is implicitly associated with that designated guest location. This instruction implicitly calculates the corresponding guest large absolute address, and puts it into the associated WR and also in an entry for that WR in the CPU window specification table for the CPU executing the "activate window" instruction.

The host does not need to know of the existence of the WRs, and the host need not have access to the large address contents in a WR when the host is using any window. The host only needs to know its window number. Automatic hardware/microcode operations transparent to the host software generate the large address, and put it into a WR when the host executes the "activate window" instruction, and automatically substitutes the large address for the small window address in a host operand whenever the host executes an instruction referencing a host window.

Preparatory operations by the host are needed before the host can invoke the "activate window" instruction to use the hardware/microcode that generates and puts a guest large address into a WR. The preparatory operations include having the host monitor for guest interception and interruption events in an SD table (represented in FIG. 9). The host monitoring may be conditioned by CPU signalling that invokes the host monitoring operation to load registers R1 and R3 upon the occurrence of an interception or interruption event, or when the host periodically interrupts itself with a timer interruption to monitor the SD table for detecting any interception or interruption indication in any of the guest SD entries.

Upon finding such indication in a guest SD in the table, the host can read information from that SD to set up the contents of the R1 general register 42 and the R3 general register 43 before executing the "activate window" instruction process shown in FIG. 3.

To set up R1, the host determines which of its windows it will use for a guest access, and puts that window number in R1. The guest zone number (ZN) is obtained by the intercepted SD entry either as the index to that SD entry, or by reading a ZN field within that entry. The ZN value is loaded by the host into ZN field in R1 42.

To set up R3, the guest's address to be accessed is obtained from another field in the intercepted SD (put into the SD by microcode on occurrence of the interception or interruption event), and that address is copied by the host into R3 43.

Figure 8:
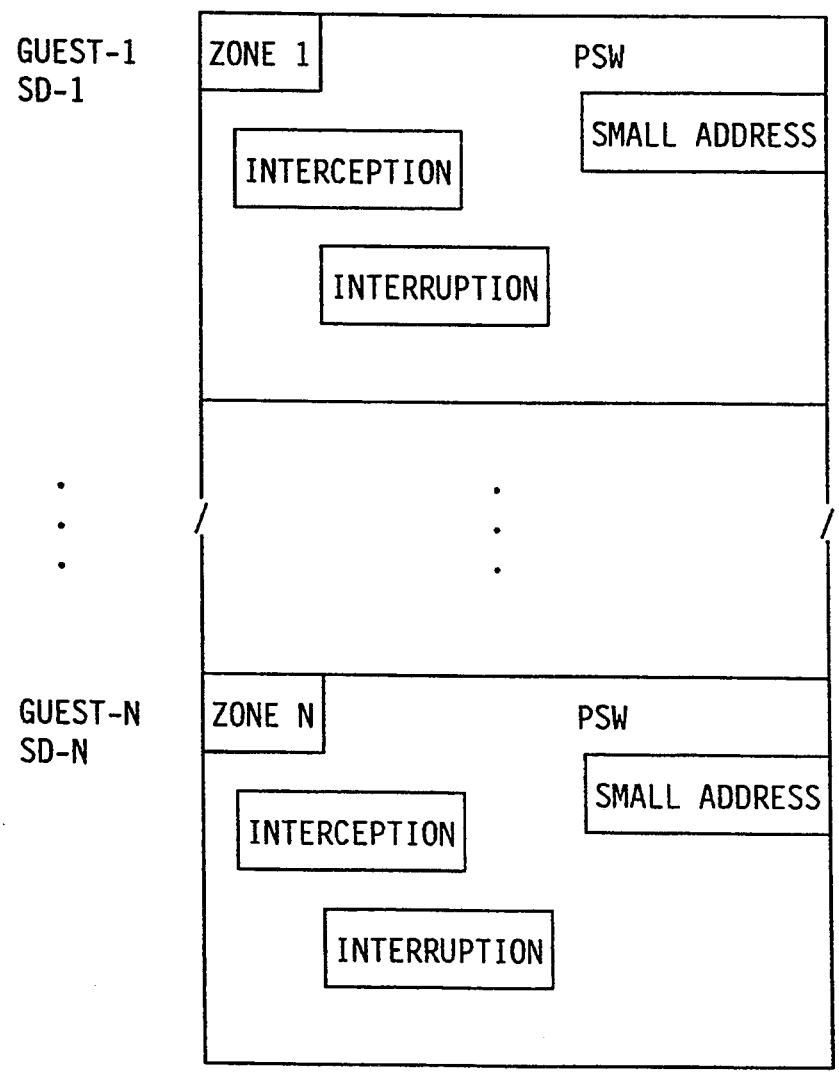
FIG. 8 represents a CPU window specification table used in the dynamic zone relocation process.

Then the activate window instruction can be executed using the process represented in FIG. 3. The instruction generates a 63 bit guest large address from the 31 bit guest small address found in R1, and loads that 63 bit address into the WR selected by the host, and also loads that 63 bit address into a "large absolute address" field in an entry assigned to that WR in a CPU window specification table entry 47. Each CPU has a "CPU window specification table" which may be in the non-program addressable "system area storage" shown in FIG. 1. This CPU table has an entry for representing the contents of each of the WRs in the respective CPU. The 63-bit address loaded into the WR is a byte address in the guest zone. FIG. 8 represents each CPU window specification table, which contains a respective WR entry for each WR in the associated CPU. Each table entry contains the current guest address assignment to the WR, including the guest's zone number, the guest's small address, and the guest's large absolute address representing the small guest address in the CPU table entry.

The ZN value in R1 is used to index into ZIT 44 to access a ZIT entry associated with the zone of the guest being accessed. Adder 49 is a 64 bit adder which adds a zone origin obtained from the ZIT entry to the small guest address in the R3 register 43, resulting in a 63 bit absolute address which is provided to a comparator 45 which compares the generated absolute address to a zone limit obtained from the ZIT entry. If the absolute address is less than the ZIT entry's zone limit (the normal case), the absolute address is stored in the CPU window specification table entry 47 located with the WR number supplied by R1 42. If the absolute address is larger than the zone limit, an exception small address value is outputted by a register 46 into the CPU window specification table entry 47, and an exception signal is generated to interrupt the CPU. The absolute address value loaded into the CPU window specification table entry 47 is then loaded into the window register 48, which now contains the large address which will be substituted for the guest small address whenever the associated window PF is addressed by a host instruction.

Figure 7:
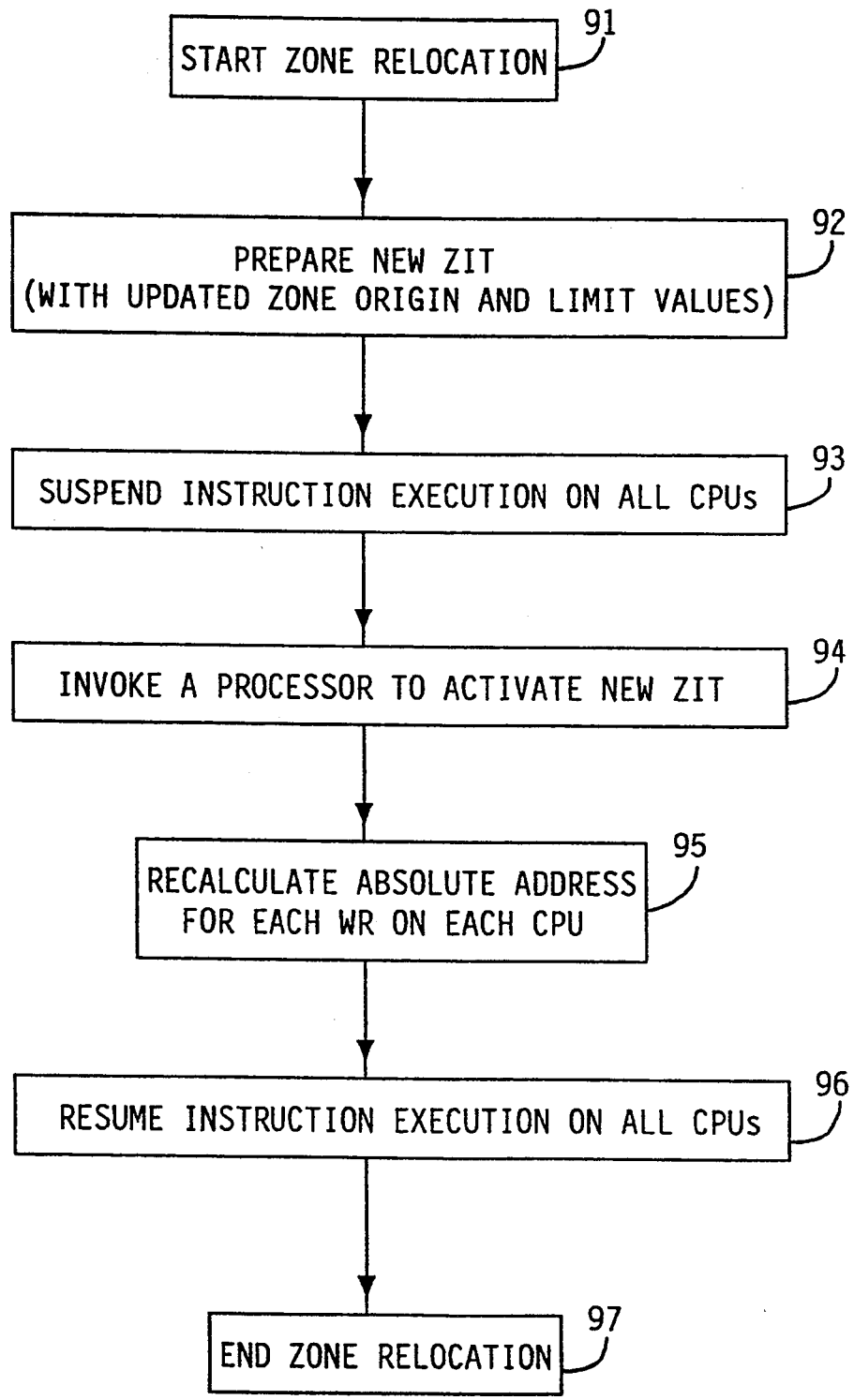
FIG. 7 is a flow chart of a process for dynamically relocating (changing) the zones in a large main memory, in order to reconfigure the guest and host zones in the memory of a system.

The CPU window specification table entry 47 is used during zone relocation in ZIT, described in regard to FIG. 7. Zone relocation is initiated by a special command.

The ZIT is shown in FIG. 1. Each zone has a ZIT entry, which has fields containing the zone number, the zone origin, and the zone limit. The zone number may be used to verify the ZN value in R1 used to access it.

The WAR and WR registers affect CPU operations only when the system (CEC) is operating in partition mode and the WAR contains a non-zero value.

Figure 4:
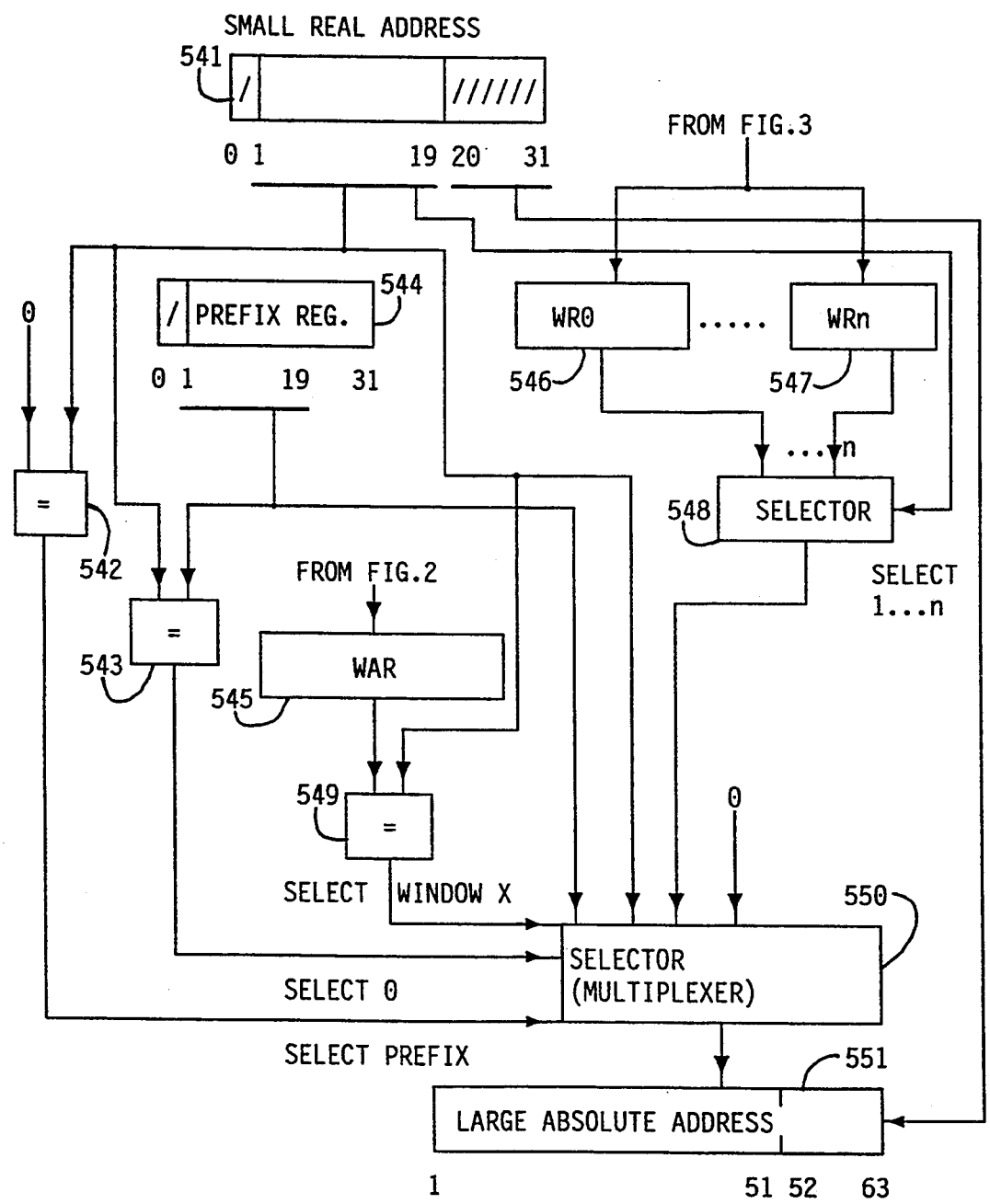
FIG. 4 represents a process used in the preferred embodiment for selecting a WR to output a guest large address and substitute it for a host operand small address.
Figure 5:
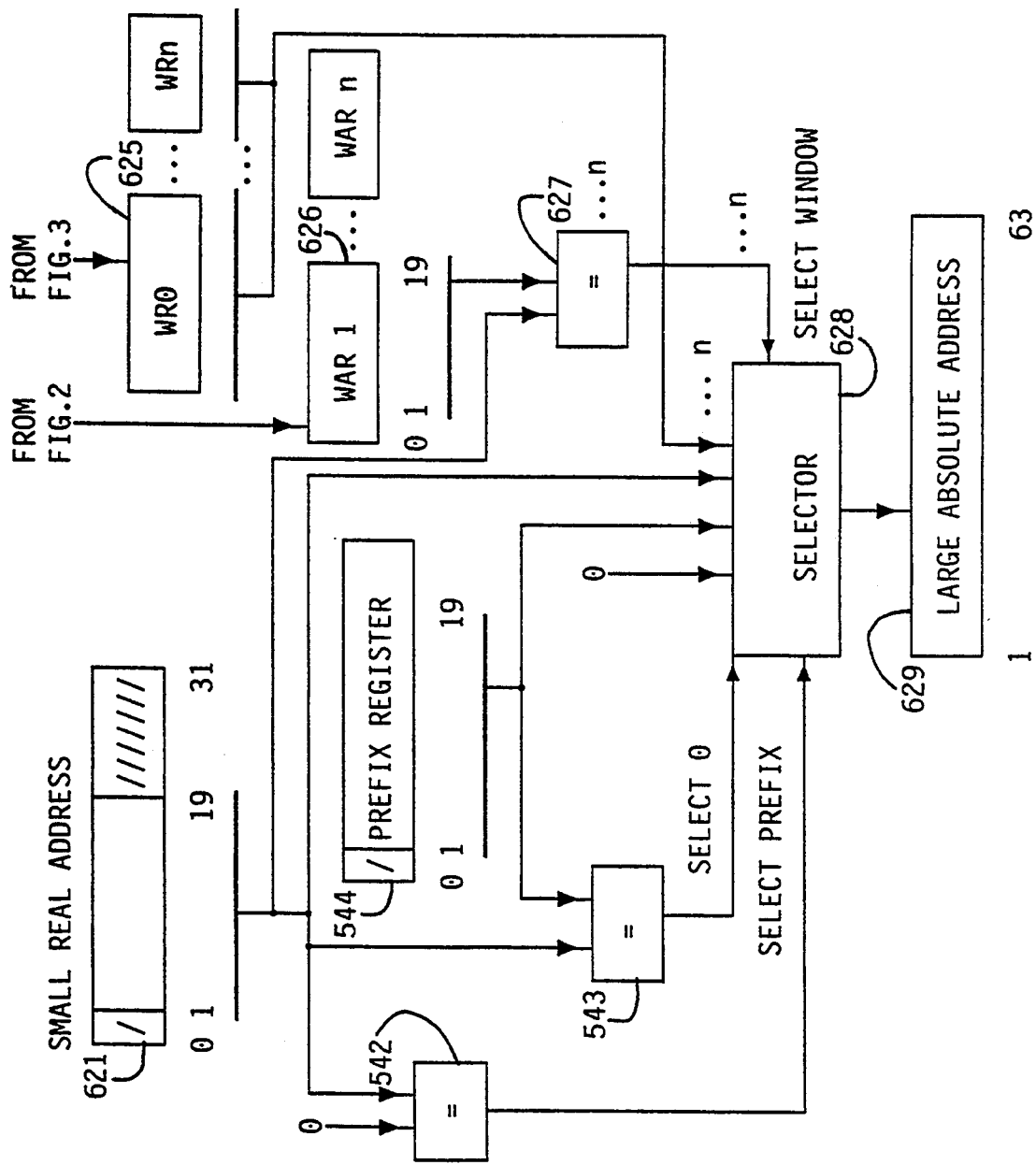
FIG. 5 represents an alternate process for selecting a WR for substituting its large address for a host operand small address equal to a host window PF.

Process for Accessing a Guest Location—FIGS. 4 and 5

The host uses the hardware and process in FIG. 4 or 5 for obtaining addressability to a guest location detected during interruption or interception handling. Guest locations are often accessed by a host for simulating guest instructions. FIG. 4 uses one WAR, and FIG. 5 uses plural WARs, but otherwise they operate similarly.

An interception code may indicate the host must examine an intercepted guest instruction. Host software may access the guest's SD entry and fetch in a PSW (program status word) field the guest's zone number (ZN) and the small address to the intercepted instruction. The host then specifies a window number and executes the activate window instruction to obtain addressability to the guest location. Then the host puts the associated guest window PF for each guest operand in a host instruction which is to access the guest instruction in the guest zone and copy it into the host zone at a host designated location.

In more detail to perform this access, the host selects one of its window numbers, puts the selected window number in R1 register 42 and puts the guest's ZN and PSW address in R3 register 43, and then invokes the activate window instruction to generate and store a large address in the WR associated with the selected window number. In this manner, the host uses the hardware represented in FIG. 4 or 5 in performing the process shown in the flow diagram in FIG. 6 to access the guest instruction.

In FIG. 4 or 5, a small (real) address is inputted into an input register 541 or 621 by the host access into a guest's SD, and a corresponding large absolute address is outputted into an output register 551 or 629 respectively.

When a host window is accessed by a host instruction, the address selection process used in FIG. 4 or 5 outputs one of several types of large addresses to register 551 or 629: which are: a guest zone prefix absolute address, a guest zone inverted-prefix absolute address, or any guest zone absolute address which in neither a prefix or inverted prefix address.

Whenever the host specifies a storage operand which is not to one of its windows, that operand is accessed within the host zone. Thus, when a host instruction accesses a host PF which is not defined by a WAR as a host window, the address selection process used in FIG. 4 or 5 outputs a host zone large absolute address in register 551 or 629, respectively.

If the inputted small address is real address zero, a prefixing process operates in FIGS. 4 and 5 to exchange real-address zero for a pre-determined non-zero absolute address provided in a prefix register of the respective CPU. Each CPU in the system has a different prefix large address preassigned in its prefix register (register 544 in FIG. 4 or 5), so that each CPU accesses a different prefix page frame (which contains values pertaining only to that CPU, such as interruption values, etc.) The prefix transformation operation generates an absolute address by exchanging small real address zero for the prefix address in its prefix register. Also a reverse prefixing process is done in FIG. 4 or 5 which exchanges any small real address equal to the CPU's prefix value for large address zero, so that the reverse prefix operation always accesses page frame zero for all CPUs.

In each of FIGS. 4 and 5, bits 1–19 in an inputted host small real address in a register 541 are compared in comparator 542 with zero (for prefixing), and simultaneously (for reverse prefixing) in comparator 543 with a prefix value provided by bits 1–19 in the CPU's prefix register 544. A compare equal condition in comparator 543 or 542 causes a large address from either the prefix register 544 or the reverse prefix zero large address to be sent to a selector 550 or 628, respectively, which outputs that large address in register 551 or 629.

The distinction between FIGS. 4 and 5 is in the way the host window PFs are selected. In both FIGS. 4 and 5, the value of the host operand small address controls the selection of the WR. In FIG. 4, the host window PF selection is determined by the state of bit 19 in its host input register 541—when the state of input register 19 is 0, the window of WR0 is selected, and when the state of bit 19 is 1, the window of WR1 is selected. In FIG. 5, each WR is associated with a different respective WAR, and the WR (associated with the WAR having its contained host window PF bits 1-19 equal to the input bits 1-19) is selected.

In more detail in FIG. 4, the process of transforming a small host real address to a large absolute address is indicated by the following process:

1. When input address bits 1-18 are equal to bits 1-18 in WAR 545 and input register bit 19 is 0, and the WR0 content is not equal to zero, and the absolute page frame address specified by WR0 is substituted for bits 1-19 of the input address (replacing large absolute address bits 33-51). The highest order bits 1-32 in WR0 are not affected—they remain the zone origin bits provided in FIG. 3; and the lowest order bits 52-63 in WR0 are not affected—they are the displacement bits 20-31 from the inputted small address.

2. When input address bits 1-18 are equal to WAR bits 1-18 and input register bit 19 is 1, and the WR1 content is not equal to zero, the absolute page frame address specified by WR1 replaces bits 1-19 of the address.

3. When inputted real address bits 1-18 are not equal to WAR bits 1-18, or if inputted bit 19 is 0 and the WR0 content is equal to zero, or if inputted bit 19 is 1 and the WR1 content is equal to zero, the address remains unchanged.

When the WAR content is equal to zero, the inputted address remains unchanged in the outputted large address, because no host window has been selected (host window zero cannot be used as a window). Then, the outputted address is the inputted address with the host zone origin concatenated to the high-order end of the small address.

In all cases, D bits 20-31 in the small address in register 541 are transferred unchanged to the outputted large address.

When bits 1-19 of the WAR are equal to bits 1-19 of the host prefix register, the small absolute address in the prefix register 544 is outputted as a large absolute address.

In FIG. 4, a selector 548 uses low-order bit 19 of the small real address 541 to select among the two window registers 546 and 547. If more than two host window PFs are provided by the WAR, then selector receives plural low-order bits through bit 19 in the inputted small address to perform the selection of one of n number of WRs respectively associated with the window PFs.

In FIG. 5, selector 627 operates analogously to selector 548 in FIG. 4. However in FIG. 5, selector 627 compares the inputted small address bits 1-19 to each WAR's bits 1-19, and selects the WR of any WAR having equal bits 1-19.

In FIG. 4, another selector 550 selects among the real address 541, the prefix register 544, the window register selected by the selector 548, and a value of zero as follows: If the inputted real address in register 541 is equal to zero (as determined by box 542), then the prefix register 544 is selected. If the real address 541 is equal to the prefix register 544 (as determined by box 543), then a value of zero is selected. If inputted bits 1-19 in input register 541 are equal to bits 1-19 in WAR 45 (as determined by box 549), then the WR value selected by the selector 548 is outputted. If none of these comparisons are equal, inputted address bits 1-19 in register 541 are directly put into output selector as large address bits 33-51 to access the host zone.

In FIG. 5, selector 628 operates essentially the same as selector 550 in FIG. 4.

The value of the large absolute address in selector 550 or 628 is finally transferred to output register 551 or 629, respectively, from which the address is used to access the large memory.

Figure 6:
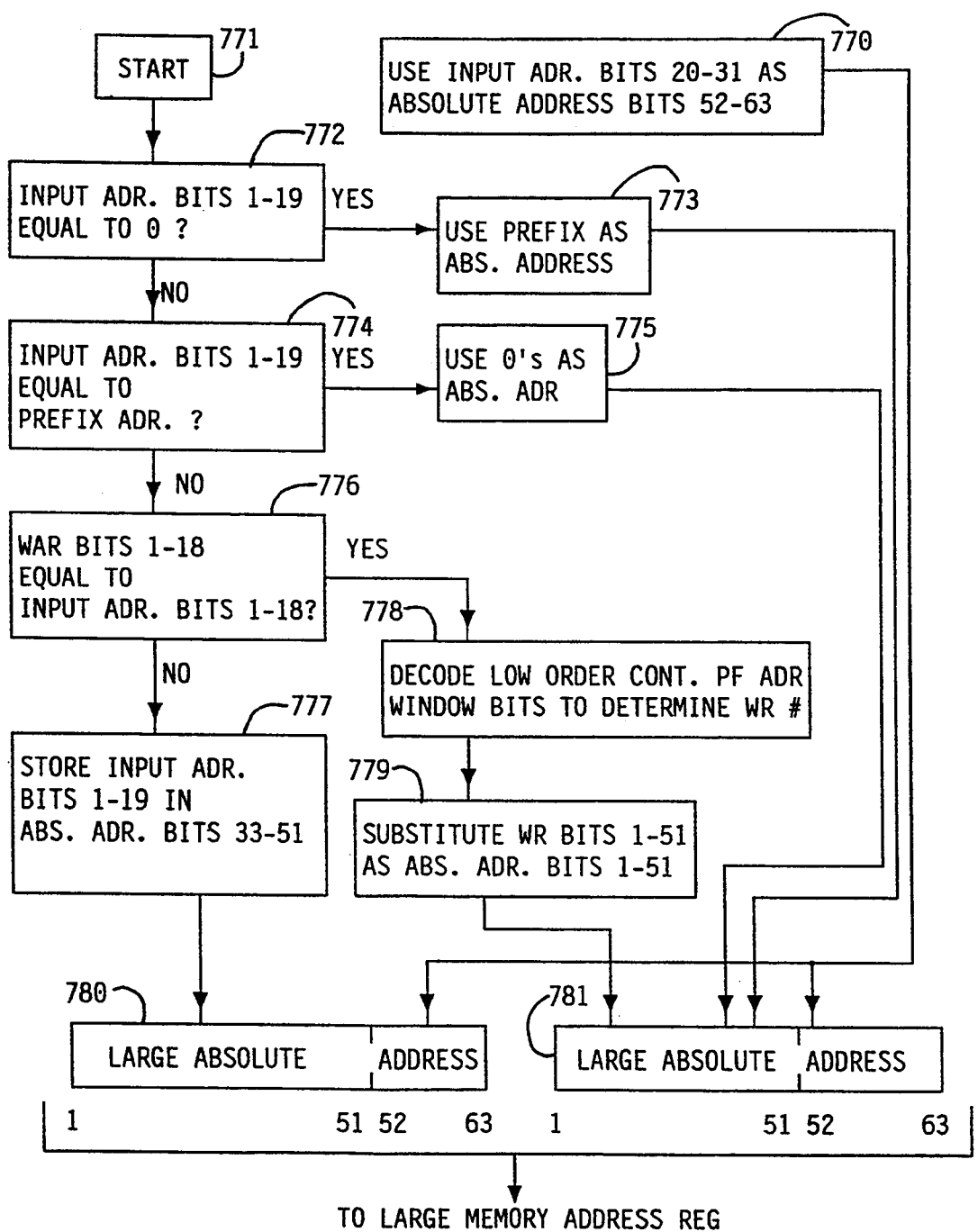
FIG. 6 is a flow chart of a process using a small host address in generating a large address for accessing any location in a large memory, using address substitution to access any guest zone location.

Host accessing of a Guest Location—FIG. 6

FIG. 6 represents the process used by the hardware shown in FIG. 4 or 5 to generate a large absolute address. Each FIGURE transforms an inputted small real address into a large absolute address. During the address transformation process, the prefix/zero part of the processing may be done in parallel with the WR/WAR selection processing.

The processing is started at step 771. Step 772 is entered and compares input address bits 1-19 to a value of zero. If input bits 1-19 are equal to zero, then step 773 sets the absolute address to the contents of the prefix register. If step 772 finds the input bits 1-19 are not equal to zero, then step 774 compares these same input bits to the corresponding bits of the prefix register. If these input bits are equal in step 772, then step 775 sets the absolute address to all zeros. If step 774 finds these bits are not equal, then step 776 compares the input bits 1-18 to WAR bits 1-18 to determine if a window is being used.

If the bits 1-18 are equal, then step 778 decodes the low order bit 19 of the inputted address to determine the selection of WR0 or WR1.

Next, step 779 substitutes the appropriate window register bits 1-51 in the absolute address for the input address bits 1-19 to provide output address 781.

If step 776 finds inputted bits 1-18 and the corresponding PF bits in the WAR are not equal, then step 777 is entered to store the inputted address bit 1-19 in the absolute address bit positions 33-51, which provides outputted absolute address 780.

The large address 780 or 781 is provided to the controller of the large memory for the requested access.

Relocation of Zones—FIG. 7

FIG. 7 represents a flow chart of CPU zone address relocation for reconfiguring the large memory in a system, which may have one or more CPUs. The zones are reconfigured among the host and logical partitions in the system. A change in the location of a guest zone, or of the host zone, in large storage is transparent to the host program and to the guests. Any existing guest zone may have its origin or limit changed, any guest zone may be deleted, and one or more new guest zone(s) may be added. If a guest zone origin is changed, that zone is being relocated in the large memory; then, either or both of the large absolute addresses in WR0 or WR1 must be changed.

The host zone may be either implicit (not defined in ZIT) or explicit (defined in ZIT). If implicit, the host zone is never relocated, and no host limit check is done.

If explicit, a check is done between the content of each WAR and the host zone limit in the ZIT host entry (e.g. entry with ZN0).

Since any guest zone limit may be changed, each small address in each CPU window specification table entry (being used by a host window) must be checked against its guest zone limit. Then if the limit is exceeded, the small address and its corresponding large absolute address (in the CPU window specification table entry and in a corresponding WR) must be invalidated.

To perform reconfiguration, a special command is issued by one of the CPUs in the system to start the zone relocation process at step 91. This command may be issued at any time during system operation, because the process in FIG. 7 handles the address adjustments needed to continue system operation after any zones have been relocated, added and/or deleted.

Then step 92 is entered in which a system administrator (a human), or the host program, or an assigned guest program in a logical partition, has previously set up a replacement ZIT in programmable memory. The replacement ZIT may contain unchanged zone origin and/or limit values for any zone in the system, may change any zone origin and/or its limit value, may add one or more zone entries as new zones, and/or may delete one or more zone entries to delete zones from the system. The currently active ZIT (to be replaced) is in the "system area storage" (not accessible to program addresses).

In the next step 93, operations by the special command momentarily suspend execution by all CPUs in the system, in order to allow for replacement and activation of a new ZIT. The CPUs cannot be allowed to access a ZIT while it is being replaced, since errors might be caused during the change process.

Activation of a new ZIT is done at step 94. The activation processor may be one of the CPUs, or a special processor (for example, a service processor or some auxiliary processor) in the system. The activation process is done by hardware/microcode of the special command copying the replacement ZIT from its programmable area in memory over the old ZIT in the system area storage at the location where WR instruction hardware/microcode accesses the active ZIT.

At step 95, the special command uses the content of the newly activated ZIT, and of the CPU window specification table, to perform necessary checks and recalculations for the contents of the WAR(s) and WR(s) in each CPU. If the zone is explicitly specified in the ZIT, the value in each WAR is checked against the host zone limit to assure that the WAR content does not exceed any new limit, and if a new limit is exceeded the content is invalidated of the associated WAR (and invalidates a WR associated with a window defined by that WAR), and an exception signal is generated to require the host to re-issue the load WAR instruction to change the location of the window PF addressed in the WAR. If the limit check finds the host zone limit is not exceeded, the small address in the WAR is validated.

After the content of each WAR is checked, the process of step 95 continues by checking and recalculating the content of each WR represented in each CPU window specification table entry (see FIG. 8). Each CPU window specification table entry is accessed and its contained guest zone identifier and guest small address are used for the recalculation. The zone identifier is used to access the guest zone's ZIT entry, in which its limit is compared against the guest small address to check that the limit is not exceeded. If the limit is exceeded, the guest small address is invalidated, and the large address in the entry is invalidated (e.g. set it to zero, or set off a valid bit). If the guest small address is within the limit, the corresponding large absolute address in the table entry is recalculated by using the activate window instruction process shown in FIG. 3 for the window entry, and the recalculated value is put into the corresponding WR and in the CPU window specification table entry. If any zone in any CPU window specification table is not found in the new ZIT, that zone has been deleted; then both the small address field and the large address field are set invalid for that window entry in the CPU window specification table, and the content of the associated WR entry is set invalid.

Then at step 96, all CPUs in the system have their normal instruction processing resumed by continuing from where they were suspended. The special instruction operations are then complete and ended at step 97.

CPU Window Specification Table—FIG. 8

FIG. 8 represents the CPU window specification table. Each CPU in the system (allowed to run guests and the host) has its own window specification table stored in the system area storage.

It contains a respective entry for each window designed into a respective CPU. The window entries in the table are indexed by window number, W0 and W1. Each entry contains the zone number currently assigned to the respective window, the large absolute address currently contained in the associated WR, and the small address represented by the large absolute address in the same entry. If no window is currently assigned to an entry, zeros are stored in the entry (or an optional valid bit is set to its off state).

The fields in an entry are processed as explained in other sections of this specification.

Many variations and modifications are shown which do not depart from the scope and spirit of the invention and will now become apparent to those of skill in the art. Thus, it should be understood that the above described embodiments have been provided by way of example rather than as a limitation.

Having thus described our invention, what we claim as new and desire to secure by Letters Patent is:

1. A method for use in a computer system having at least one CPU and a large memory having a plurality of zones in which a host and one or more guests use instruction operands having small addresses that cannot access locations outside of a memory zone local to the host or guest, the method enabling the host to access any location in any guest zone in the large memory, comprising the steps of:

structuring each CPU in the system with one or more window access registers (WARs), and with one or more window registers (WRs) respectively related to one or more designated window(s) provided for the CPU;

executing a load WAR instruction for locating one or more page frames (PFs) in the memory zone local to the host and associating the PF(s) with one of the designated window(s) of the CPU to make each located PF a host window PF;

executing an activate window instruction for associating a guest location in any guest zone with the one of the designated window(s) and with the one of the WRs, the guest location being indicated by a guest identifier and a guest small address; and generating a large absolute address for the large memory from the guest identifier and guest small address, and loading the large absolute address into the WR associated with the one of the designated window(s) to enable the host to access the guest location when a host operand addresses the host window PF associated with the one of the designated window(s).

2. A method for enabling a host to access any location in any guest zone in a large memory as defined in claim 1, further comprising the steps of:

executing a host instruction having an operand small address for addressing the host window PF previously located by the load WAR instruction; and substituting by CPU hardware/microcode the large absolute address in the WR for the operand small address for enabling host execution of the operand small address to access the guest location located by the large absolute address.

3. A method for enabling a host to access any location in any guest zone in a large memory as defined in claim 1, further comprising the steps of:

executing a host instruction having an operand small address for addressing a PF in the host zone other than the host window PF; and accessing by CPU hardware/microcode a location in the host zone addressed by the operand small address.

4. A method for enabling a host to access any location in any guest zone in a large memory as defined in claim 1, further comprising the steps of:

providing a zone information table (ZIT) in the memory for locating the zones of the guests in the large memory, each ZIT entry designating a respective guest zone and each entry having fields for a zone identifier, an origin large address and a limit large address for defining bounds of a respective guest zone; and comparing the limit large address to each generated large absolute address, and rejecting any generated large address greater than the limit large address to prevent host use of an invalid guest address.

5. A method for enabling a host to access any location in any guest zone in a large memory as defined in claim 4, further comprising the step of:

generating an exception signal to reject a generated large address greater than the limit large address for interrupting host operations.

6. A method for enabling a host to access any location in any guest zone in a large memory as defined in claim 4, further comprising the steps of:

loading into one or more CPU general register(s) a window number, a small address and a guest zone identifier for a guest location in a guest zone to be accessed by the host;

executing the activate window instruction by using the contents of the general register(s) to generate a guest large absolute address and to load the large absolute address into the WR to associate the WR with the window number in the general register(s).

7. A method for enabling a host to access any location in any guest zone in a large memory as defined in claim 6, further comprising the steps of:

generating the large absolute address by adding the guest small address in the general register to an origin large address in a ZIT entry for the guest zone.

8. A method in a computer system having a plurality of CPU's for enabling a host to access any location in any guest zone in a large memory as defined in claim 4, when zones in the system are allowed to be dynamically reconfigured, further comprising the steps of:

writing a replacement ZIT in a program accessible area in the large memory, the replacement ZIT having entries different from corresponding entries in an active ZIT in a non-program accessible system area storage, and controlling the system only with the active ZIT;

suspending execution by all CPUs in the computer system;

issuing a special command by a selected CPU in the computer system to overlay the active ZIT with the replacement ZIT while execution in all CPUs is suspended to activate the replacement ZIT;

recalculating a large address found in each entry in a CPU window specification table by using a guest small address and a zone identifier found in each entry and using an entry in the newly activated ZIT for the identified zone, and reloading the CPU window specification table entry and the related WR with a recalculated large address; and resuming instruction execution of all CPUs in the computer system to complete the reconfiguration of the zones in the system for enabling all CPUs to use the zones in the newly activated ZIT.

9. A method for enabling a host to access any location in any guest zone in a large memory as defined in claim 1, further comprising the step of:

providing a CPU window specification table (WST) having entries respectively associated with the designated windows and related WRs in the CPU, each entry in the WST containing a zone number field, a guest small address field and a large absolute address field to indicate a guest location currently associated with the WR related to a WST entry.

10. A method for enabling a host to access any location in any guest zone in a large memory as defined in claim 9, further comprising the steps of:

writing into a WST entry a guest zone identifier and a guest small address for the one of the designated window(s) when executing an activate window instruction to represent a guest location represented in an associated WR.

11. A method for enabling a host to access any location in any guest zone in a large memory as defined in claim 10, further comprising the step of:

writing a generated guest large absolute address into the WST entry to represent the guest small address written in the same entry.

12. A method for enabling a host to access any location in any guest zone in a large memory as defined in claim 1, further comprising the steps of:

loading in a CPU general register of a CPU a small address for locating the host window PF(s); and executing the load WAR instruction that loads the WAR with the address in the general register to designate the host window PF(s) for use by the host.

13. A method for enabling a host to access any location in any guest zone in a large memory as defined in claim 1, further comprising the steps of:

intercepting a guest operation while the guest is executing a guest instruction;

capturing in a guest state descriptor entry in a host table an intercepted guest small address of a location of a guest instruction, and indicating the guest zone identifier for the entry;

executing the activate window instruction to generate a guest large address for the intercepted guest small address in the guest zone, and storing the guest large address in the WR related to the designated window;

accessing by the host of the guest instruction by executing a host instruction having a host operand small address addressing the host window PF associated with the designated window; and the computer system substituting the guest large address in the WR for the host operand address for fetching the guest instruction in the guest zone.

14. A method for enabling a host to access any location in any guest zone in a large memory as defined in claim 13, further comprising the steps of:

simultaneously comparing the guest small address with a prefix address in a prefix register and with address zero to determine if the guest small address is a prefix or reverse-prefix address, respectively; and outputting the prefix address from the prefix register or outputting address zero as a reverse-prefix large address if a compare equal condition is obtained with the prefix register or with address zero, instead of outputting any large address from any WR.

15. A method for enabling a host to access any location in any guest zone in a large memory as defined in claim 1, further comprising the steps of:

using a single WAR to locate a single host window PF associated with the one of the designated window(s) associated with the WR.

16. A method for enabling a host to access any location in any guest zone in a large memory as defined in claim 1, further comprising the steps of:

providing a plurality of WARs, each WAR locating a single host window PF associated with a respective window designated to the host.

17. A method for enabling a host to access any location in any guest zone in a large memory as defined in claim 1, further comprising the step of:

using a single WAR to locate a plurality of host window PFs respectively associated with windows designated to the host.

* * * * *